US009316182B2

(12) United States Patent
Salomon et al.

(10) Patent No.: US 9,316,182 B2
(45) Date of Patent: Apr. 19, 2016

(54) METHOD FOR DIAGNOSING A TANK VENTING VALVE

(71) Applicant: Robert Bosch GmbH, Stuttgart (DE)

(72) Inventors: Stefan Salomon, Zaberfeld-Michelbach (DE); Uwe Nusser, Furtwangen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 193 days.

(21) Appl. No.: 14/350,849

(22) PCT Filed: Sep. 25, 2012

(86) PCT No.: PCT/EP2012/068852
§ 371 (c)(1),
(2) Date: Apr. 10, 2014

(87) PCT Pub. No.: WO2013/056946
PCT Pub. Date: Apr. 25, 2013

(65) Prior Publication Data

US 2015/0052986 A1 Feb. 26, 2015

(30) Foreign Application Priority Data

Oct. 20, 2011 (DE) ......................... 10 2011 084 859

(51) Int. Cl.

| | |
|---|---|
| ***G01M 15/04*** | (2006.01) |
| ***F02M 25/08*** | (2006.01) |
| ***F02M 35/10*** | (2006.01) |
| *F02D 41/00* | (2006.01) |

(52) U.S. Cl.
CPC ....... *F02M 25/0809* (2013.01); *F02M 25/0827* (2013.01); *F02M 25/0836* (2013.01); *F02M 35/1038* (2013.01); *F02D 41/0037* (2013.01); *F02D 2200/0406* (2013.01)

(58) Field of Classification Search
CPC .......... F02M 25/0809; F02M 25/0827; G01M 15/04
USPC ................ 73/114.37, 114.38, 114.39, 114.43
See application file for complete search history.

(56) References Cited

U.S. PATENT DOCUMENTS 5,476,083 A * 12/1995 Blumenstock ................ 123/520
7,162,914 B2 * 1/2007 Streib et al. .................... 73/49.7

(Continued)

FOREIGN PATENT DOCUMENTS

DE 10 2008 063758 7/2010
DE 10 2009 002746 11/2010

(Continued)

*Primary Examiner* — Eric S McCall
(74) *Attorney, Agent, or Firm* — Kenyon & Kenyon LLP

(57) ABSTRACT

A method for diagnosing a tank venting valve. This includes measuring a first pressure $p_1$ in the induction pipe of an internal combustion engine; activating the tank venting valve so as to open; measuring a second pressure $p_2$ in the induction pipe of the internal combustion engine after the opening activation of the tank venting valve; calculating a control value K by subtracting the first induction pipe pressure $p_1$ from a second induction pipe pressure $p_2$ and adding a correction pressure $p_K$, which is calculated from the leakage air adaptation of an internal combustion engine; and detecting A defect of the tank venting valve, when the control value K falls below a threshold value.

5 Claims, 2 Drawing Sheets

(56) References Cited

U.S. PATENT DOCUMENTS

| | | | | |
|---|---|---|---|---|
| 7,422,194 | B2 * | 9/2008 | Krimmer et al. | 251/129.17 |
| 2005/0178192 | A1 * | 8/2005 | Hassdenteufel et al. | 73/118.1 |
| 2009/0211340 | A1 * | 8/2009 | Wang et al. | 73/40.7 |
| 2010/0162804 | A1 * | 7/2010 | Grunwald et al. | 73/114.39 |
| 2011/0067487 | A1 * | 3/2011 | Haag et al. | 73/40 |
| 2011/0079298 | A1 * | 4/2011 | Eser | 137/488 |
| 2014/0299110 | A1 * | 10/2014 | Heller et al. | 123/520 |
| 2014/0345574 | A1 * | 11/2014 | Haefele | 123/519 |

FOREIGN PATENT DOCUMENTS

| | | |
|---|---|---|
| WO | 02/18165 | 3/2002 |
| WO | 03/033901 | 4/2003 |

* cited by examiner

METHOD FOR DIAGNOSING A TANK VENTING VALVE

FIELD OF THE INVENTION

The present invention relates to a method for diagnosing a tank venting valve. In addition, it relates to a computer program, which executes all of the steps of the method of the present invention when it runs on a computing element, as well as to a computer program product including program code, which is stored on a machine-readable carrier for performing the method of the present invention, when the program is executed on a computer or control unit.

BACKGROUND INFORMATION

Today's internal combustion engines include tank venting systems, in which fuel evaporated in the tank is stored in an active carbon filter, which is connected to the induction pipe of the internal combustion engine via a tank venting valve capable of being closed off. In response to opening the tank venting valve, air is drawn in via a connection of the active carbon filter to the environment, the air entraining the temporarily stored fuel and supplying it for combustion. Using the tank venting valve, the amount of gas drawn in is controlled in such a manner, that on one hand, the active carbon filter is sufficiently flushed with air, and on the other hand, no intolerably large disturbances to the fuel-air ratio of the mixture supplied to the internal combustion engine occur.

To comply with legal regulations, a defective tank venting valve installed in a tank venting system must be recognized as defective, using suitable diagnoses. It is known that correct opening of the tank venting valve may be checked by activating the tank venting valve so as to open, without the overall system taking this opening activation into consideration. Thus, in the control unit of the internal combustion engine of the tank venting valve, no consideration is given to the proportion of air and fuel that is supplied to the engine, via the tank venting valve, when it is activated so as to open. It may be inferred that a tank venting valve is intact or defective, using the reaction of the induction pipe pressure to this occurring disturbance variable, which causes a change in pressure.

A defect is present, when the difference between the induction pipe pressure after the opening activation of the tank venting valve and prior to the opening activation of the tank venting valve is below a particular threshold value. In the case of a tank venting valve that is jammed shut, then, for example, activating the tank venting valve so as to open does not open the valve, which means that no change in pressure occurs in the induction pipe. The ascertained pressure difference is zero, and a defect of the tank venting valve is detected.

SUMMARY OF THE INVENTION

The method of the present invention for diagnosing a tank venting valve includes the following:

- measuring a first pressure $p_1$ in the induction pipe of an internal combustion engine;
- activating the tank venting valve so as to open;
- measuring a second pressure $p_2$ in the induction pipe of the internal combustion engine after the opening activation of the tank venting valve;
- calculating a control value K by subtracting first induction pipe pressure $p_1$ from second induction pipe pressure $p_2$ and adding a correction pressure $p_K$, which is calculated from the leakage air adaptation of an internal combustion engine; and
- detecting a defect of the tank venting valve, if control value K falls below a threshold value.

As the effect of the control of the tank venting valve on the air system is taken into account during the diagnosis of the tank venting valve, using correction pressure $p_K$, the opening time of the tank venting valve may be reduced. In this manner, the selectivity of the valve diagnosis is improved. In addition, the quality of the exhaust gas improves, since only a short-term disturbance in the optimum fuel/air mixture occurs. In the case of use of the internal combustion engine in a motor vehicle, the ride comfort is ultimately improved if an unnecessarily long disturbance in the fuel/air supply can be dispensed with.

In a manner analogous to the procedure in conventional diagnostic methods of a tank venting valve, according to the present invention, it may be the case that the opening activation of the tank venting valve is not to be signaled to a control unit of the internal combustion engine. When testing the operability of a tank venting valve in the tank venting system of an internal combustion engine having induction-pipe-based charge measurement, it particularly may be the case for a throttle valve in the induction pipe of the internal combustion engine to be activated so as to close, when the tank venting valve is activated so as to open.

According to the present invention, correction pressure $p_K$ is calculated, in particular, by multiplying leakage error adaptation L by mass flow rate M at a throttle valve of the internal combustion engine, dividing it by a factor $f_1$ for converting the charge to mass flow rate, and dividing it by a factor $f_2$ for converting pressure to charge in a system-based manner.

The computer program of the present invention executes all of the steps of the method of the present invention, when it runs on a computing element. In this manner, it is possible to implement the method of the present invention in an existing tank venting system without having to make structural changes. A computer program product having program code for carrying out the method of the present invention, when the program is executed on a computer or control unit, may be stored on a machine-readable carrier.

Exemplary embodiments of the present invention are illustrated in the drawing and explained in greater detail in the following description.

DETAILED DESCRIPTION

Figure 1:
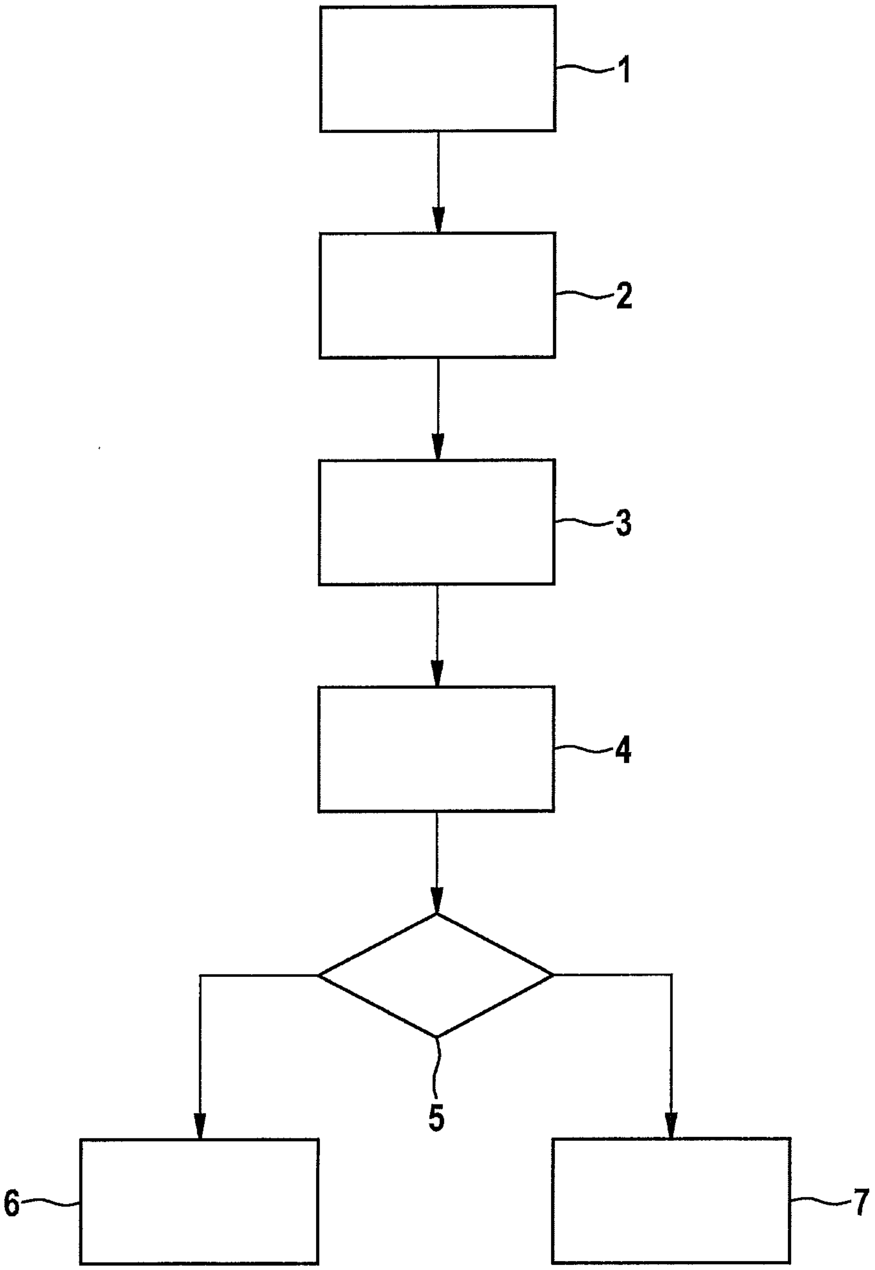
FIG. 1 shows a process diagram of a specific embodiment of the method according to the present invention.

FIG. 1 shows a process diagram of a specific embodiment of the method of the present invention for diagnosing a tank venting valve. In method step 1, a first pressure $p_1$ is measured by a pressure sensor in the induction pipe of an internal combustion engine having a tank venting system, for example, the internal combustion engine of a motor vehicle. In the suction mode of the internal combustion engine, this first pressure is less than the ambient pressure. In method step 2, the tank venting valve of the tank venting system is activated so as to open. When the tank venting valve is in working order, this results in the opening of the valve. When the opening activation ends, the tank venting valve closes again.

In method step 3, a second pressure $p_2$ in the induction pipe of the internal combustion engine is now measured. Since by opening the tank venting valve, a fuel/air mixture flows out of the active carbon filter of the tank venting system, into the induction pipe of the internal combustion engine, second pressure $p_2$ is greater than first pressure $p_1$ when tank venting valve is successfully opened. In method step 4, according to Formula 1, a control value K is calculated by subtracting first induction pipe pressure $p_1$ from second induction pipe pressure $p_2$ and adding a correction pressure $p_K$:

$$K=p_2-p_1+p_K \qquad \text{(Formula 1)}$$

Correction pressure $p_K$ is calculated according to Formula 2, by multiplying leakage error adaptation L of the internal combustion engine, which includes induction-pipe-based charge measurement, by mass flow rate M at a throttle valve of the induction pipe, dividing it by a factor $f_1$ for converting charge of the mass flow rate, and dividing it by a factor $f_2$ for converting pressure to charge in a system-based manner:

$$p_K = \frac{L \cdot M}{f_1 \cdot f_2} \qquad \text{(Formula 2)}$$

In method step 5, control value K is compared to a threshold value. If the control value falls below the threshold value, then, in step 6, a defect of the tank venting valve is detected, and optionally, a fault entry is made in a memory of an on-board diagnostic unit (OBD). On the other hand, if the control value corresponds to at least the threshold value, then, in step 7, it is recognized that the tank venting valve is operating correctly.

Figure 2:
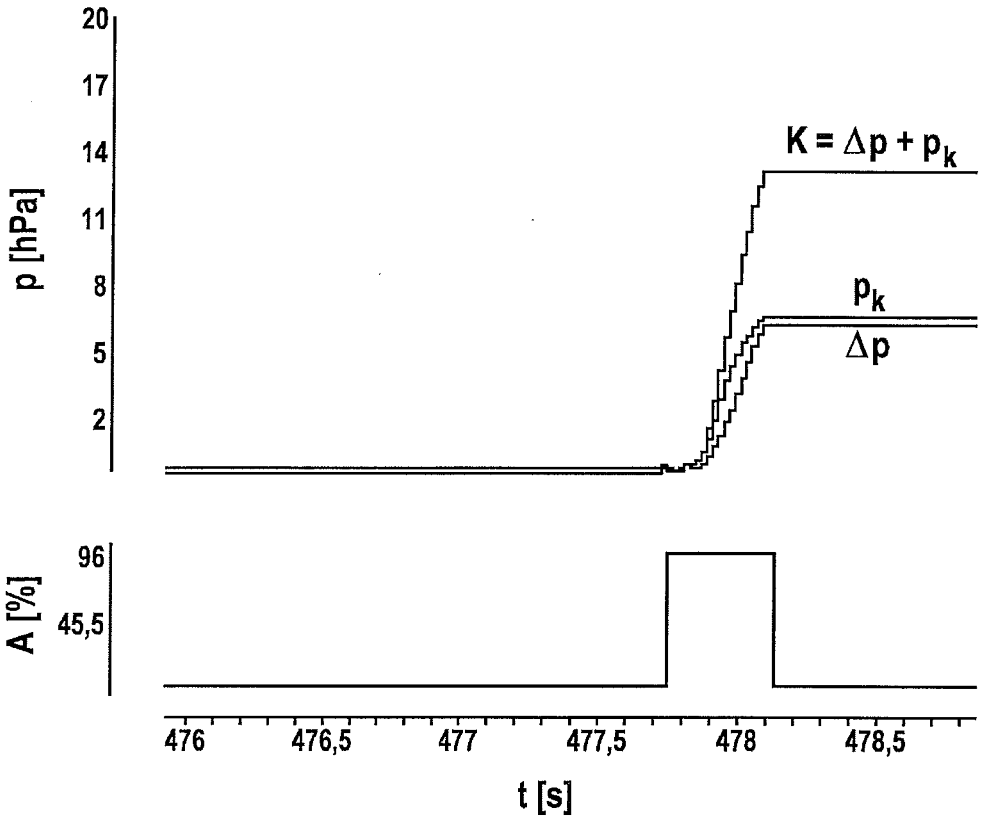
FIG. 2 shows the time characteristic of the induction-pipe pressure difference, the correction pressure, and the control value while the tank venting valve is activated so as to open.

The time characteristic of pressure difference $\Delta p=p_2-p_1$, of control pressure $p_K$, as well as of control value K (sum of $\Delta p$ and $p_K$), is shown in FIG. 2. Prior to the opening activation of the tank venting valve (opening activation A in % of the possible opening activation), a change in the induction pipe pressure has not yet occurred, and pressure difference $\Delta p$ is zero. In addition, leakage air adaptation has also not yet taken place at this time, which means that correction pressure $p_K$ is also zero. When the intact tank venting valve is activated so as to open, an increase in induction pipe pressure $p_2$ and, therefore, in pressure difference $\Delta p$, initially occurs. An increasing leakage air adaptation L leads to a renewed decrease in induction pipe pressure $p_2$, and therefore to a decrease in pressure difference $\Delta p$, while correction pressure $p_K$, which is calculated from leakage air adaptation L, simultaneously increases.

After the end of the opening activation of the tank venting valve, a differential induction pipe pressure $\Delta p>0$ and a control value K, which corresponds to approximately four times the pressure difference $\Delta p$, result. From this, it is discernible that the method of the present invention renders possible a more sensitive diagnosis of a tank venting valve than that of the related art. Thus, the present invention allows a threshold value to be selected, which is between pressure difference $\Delta p$ and control value K for an intact tank venting valve. In a conventional diagnostic method, this threshold value would erroneously result in entry of a fault. Setting a higher threshold value allows the tank venting valve to be diagnosed, using a lower opening activation duration than in the case of a conventional diagnosis.

What is claimed is:

1. A method for diagnosing a tank venting valve, the method comprising:

measuring a first pressure $p_1$ in the induction pipe of an internal combustion engine;

activating the tank venting valve so as to open it;

measuring a second pressure in the induction pipe of the internal combustion engine after the opening activation of the tank venting valve;

determining a control value by subtracting the first induction pipe pressure from the second induction pipe pressure and adding a correction pressure, which is determined by multiplying the leakage air adaptation by the mass flow rate through a throttle valve, dividing it by a factor for converting charge to mass flow rate, and dividing it by a factor for converting pressure to charge in a system-based manner; and detecting a defect of the tank venting valve, if the control value falls below a threshold value.

2. The method of claim 1, wherein the opening activation of the tank venting valve is not signaled to a control unit of the internal combustion engine.

3. The method of claim 1, wherein when the tank venting valve is activated so as to open it, a throttle valve in the induction pipe of the internal combustion engine is activated so as to close.

4. A computer readable medium having a computer program, which is executable by a processor, comprising:

a program code arrangement having program code for diagnosing a tank venting valve, by performing the following:

measuring a first pressure $p_1$ in the induction pipe of an internal combustion engine;

activating the tank venting valve so as to open it;

measuring a second pressure in the induction pipe of the internal combustion engine after the opening activation of the tank venting valve;

determining a control value by subtracting the first induction pipe pressure from the second induction pipe pressure and adding a correction pressure, which is determined by multiplying the leakage air adaptation by the mass flow rate through a throttle valve, dividing it by a factor for converting charge to mass flow rate, and dividing it by a factor for converting pressure to charge in a system-based manner; and detecting a defect of the tank venting valve, if the control value falls below a threshold value.

5. A system for diagnosing a tank venting valve, comprising:

a control arrangement, including a processor, for diagnosing the tank venting valve, by performing the following:

measuring the a first pressure $p_1$ in the induction pipe of an internal combustion engine;

activating the tank venting valve so as to open it;

measuring a second pressure in the induction pipe of the internal combustion engine after the opening activation of the tank venting valve;

determining a control value by subtracting the first induction pipe pressure from the second induction pipe pressure and adding a correction pressure, which is determined by multiplying the leakage air adaptation by the mass flow rate through a throttle valve, dividing it by a factor for converting charge to mass flow rate, and dividing it by a factor for converting pressure to charge in a system-based manner; and detecting a defect of the tank venting valve, if the control value falls below a threshold value.

* * * * *